No. 814,467. PATENTED MAR. 6, 1906.
H. MÖHLENBRUCK.
GEARING INDICATOR FOR SCREW CUTTING LATHES.
APPLICATION FILED FEB. 23, 1904.

2 SHEETS—SHEET 1.

No. 814,467.  
PATENTED MAR. 6, 1906.  
H. MÖHLENBRUCK.  
GEARING INDICATOR FOR SCREW CUTTING LATHES.  
APPLICATION FILED FEB. 23, 1904.

Witnesses:  
Inventor  
Henri Möhlenbruck  
by Georgii Massie  
his Attorney

UNITED STATES PATENT OFFICE.

HENRI MÖHLENBRUCK, OF LAUSANNE, SWITZERLAND.

GEARING-INDICATOR FOR SCREW-CUTTING LATHES.

No. 814,467.  Specification of Letters Patent.  Patented March 6, 1906.

Application filed February 23, 1904. Serial No. 195,314.

*To all whom it may concern:*

Be it known that I, HENRI MÖHLENBRUCK, a citizen of Switzerland, residing at Lausanne, Switzerland, have invented a new and useful Improvement in Gearing-Indicators for Screw-Cutting Lathes, which improvement is fully set forth in the following specification.

Even the most experienced working mechanics often have great difficulty in making the calculations for finding the gearings suitable to apply to a lathe in order to cut a screw-thread of a given pitch. They often proceed by experiment and do not always choose the best combination. It is, moreover, true that such calculations are sometimes really difficult to make. The tables furnished by manufacturers with their lathes usually only relate to a restricted series of combinations and are only calculated for a single leading-screw. It is frequently needful, especially for repairs, to calculate combinations of gearing not indicated in the tables.

This invention has for its object a universal table which will replace all partial tables and will simply and rapidly indicate the possible combinations of gearing for cutting a thread of any pitch by the aid of any given leading-screw.

The invention will now be described in connection with the accompanying drawings, in which—

Figure 1:
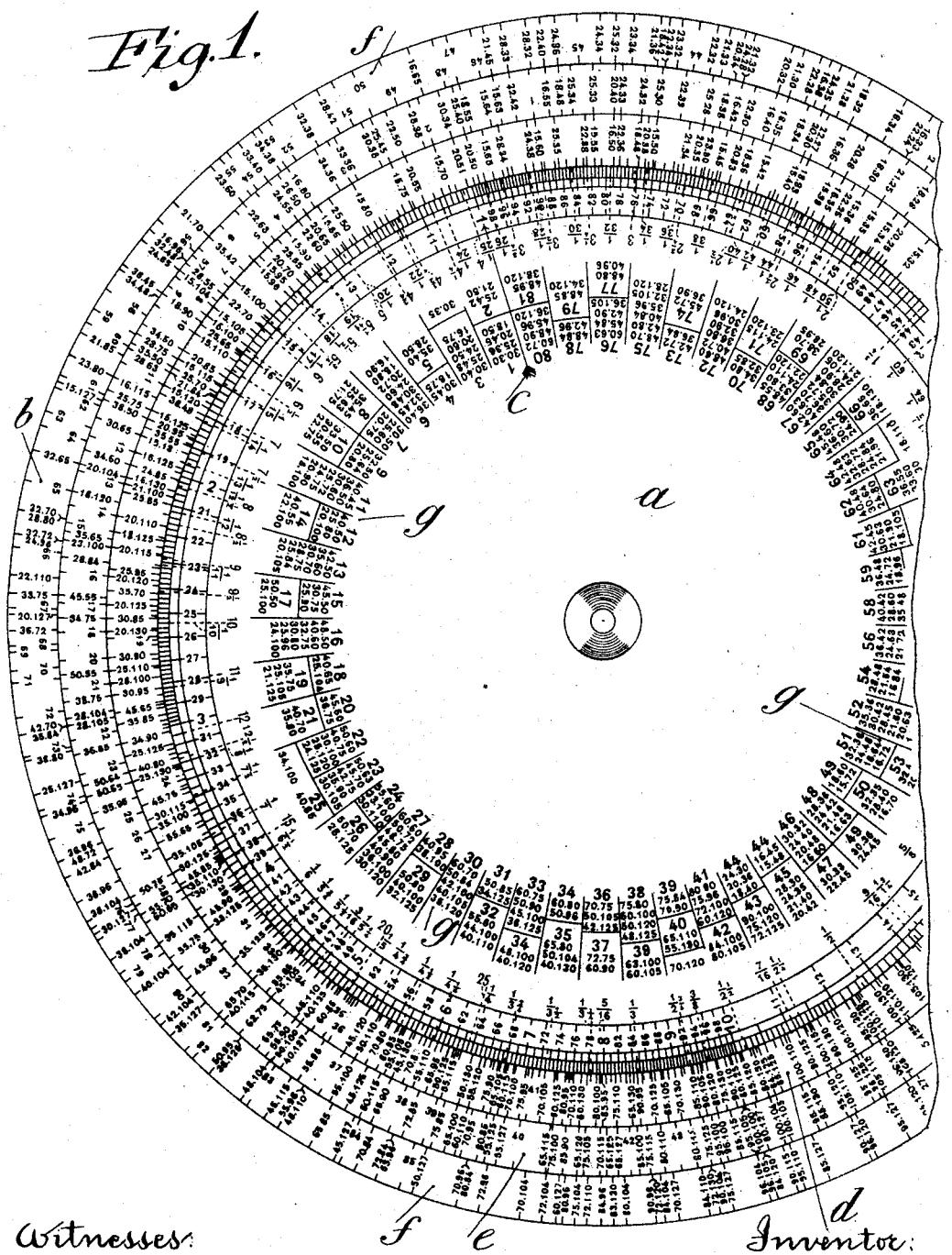
Figure 2:
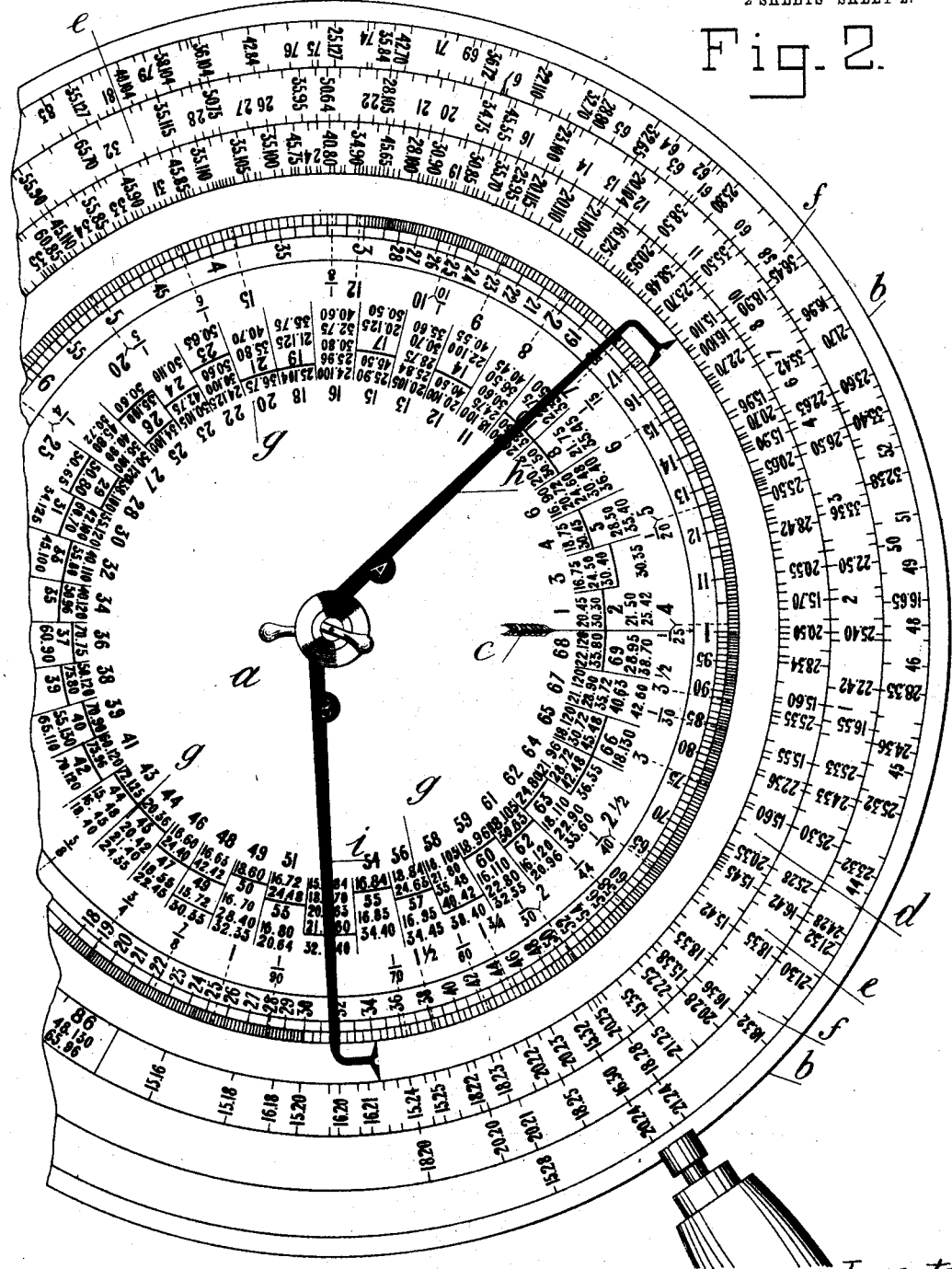

Figure 1 is a plan view, with a part broken away, of one modification of my invention; and Fig. 2, a similar view of the preferred embodiment of my invention.

Referring to the drawings, it will be seen that a device embodying my invention consists of two concentric portions $a$ and $b$, Figs. 1 and 2, bearing logarithmic scales, which have both the same unit of length as base of division. This base of division is chosen in such a manner that the scale of the logarithms of the numbers of "1" to "10" (or of "10" to "100" or "100" to "1,000") are of exactly the same length as the half-circumference of the inner disk. Thus in these tables the division-line corresponding to the logarithm of "10" is diametrically opposite to the division-line corresponding to the logarithm of "1." In the table the division-lines engraved upon the inner disk $a$ are indicated by natural numbers, corresponding to the lengths of the pitch of the screw, expressed in metrical and English pitches. In order to facilitate reading, these two graduations may be printed in different colors, (for example, in red and black for the metric pitches and in blue for the English pitches.) The figures may also be arranged differently. Thus in the example shown the metric pitches are marked radially and the English pitches concentrically. The starting-point of the graduations is indicated by an arrow $c$ and the reading is made in the opposite direction to the movement of the hands of a clock.

In the logarithmic scale engraved upon the outer portion $b$ the division-lines are designed for one or more groups of two factors, the products of which are equal to the natural number corresponding to the logarithm represented by the line in question, and these factors correspond to the numbers of teeth in the wheels to be used.

It is known that each cutting-lathe is provided with a train of interchangeable wheels provided with from fifteen to one hundred and thirty teeth, running in fives. There are also often in these trains bastard wheels having twenty-one, twenty-three, twenty-seven, thirty-three, thirty-six, forty-two, seventy-two, eighty-four, ninety-six, one hundred and four, and one hundred and twenty-seven teeth. These are the logarithms of the products of the numbers of teeth on these wheels combined two by two, which are represented by the division-lines on the scale $b$. They are therefore comprised between—

$$15 \times 16 = 240 \text{ and } 130 \times 127 = 16,510.$$

As several products can only differ from each other by a small amount, which renders the division of the outer portion $b$ very confused, this portion has been divided into several zones $d$ $e$ $f$, upon which the different groups of factors have been inscribed. As, further, it may be found that several of these products are identical, lists of products are arranged upon the inner plate at $g$. Such lists would be too numerous if arranged upon the outer graduations and would render the reading difficult. The operator is referred to these lists on the center by reference-numbers inscribed upon the outer disk.

The apparatus may be constructed in two manners. As shown in Fig. 1, the two concentric portions $a$ and $b$ are movable with respect to each other and engraved or printed upon two independent disks; but handling is facilitated by rendering one portion immovable with respect to the other, and by providing them, by way of a cursor, with an arrangement of two pointers $h$ $i$, mounted concentrically upon a central axis and which may, when desired, be made to move together or independently of each other by any suitable means—for example, by means of an eccentric. This form is shown in Fig. 2.

In order to find the numbers of teeth of the gearing to interpose between the leading-screw and the puppet of a lathe for cutting a screw of a given pitch, you proceed as follows: The two division-lines are upon the scale on $a$, which correspond to the known pitch of the leading-screw, on the one hand, and the screw to be cut out on the other hand. The end of one of the pointers is placed opposite one of these division-lines and the end of the other pointer opposite the other line. The two pointers are now made to move together in such a manner that they preserve the angle of separation which exists between the two division-lines, corresponding one to the pitch of the leading-screw and the other to the pitch of the screw to be cut. The pointers are at the same time capable of rotation around their common axis. The group formed of the two pointers $h$ $i$ are rotated along the scales until their points simultaneously coincide with two lines on the scale $b$. Usually several pairs of lines may be found which have between them the same angle of separation as the pointers.

Opposite each division of the scale $b$ is read, as has been above explained, at least one pair of factors; but the products of the pairs of factors read opposite each pointer are between them as the length of the pitch of the leading-screw is to the pitch of the screw to be cut. These two pairs of factors indicate, therefore, the number of teeth on the four wheels to be interpolated between the lathe-puppet and the leading-screw. The driving-wheels should be taken opposite the pointer indicating the pitch to be made, the driven wheels being read opposite the pointer indicating the pitch of the leading-screw. To avoid errors resulting from confusion of the pointers, they are provided with signs or indicating-letters, the pointer $h$ being marked with the letter "A" and the pointer $i$ with the letter "B."

A numerical example will perhaps best explain the method of using the apparatus. Suppose it is required to cut a screw having a pitch of one millimeter, the leading-screw of the lathe having a pitch of four millimeters. The pointer A is placed very exactly upon the graduation marked "4" on the scale $a$. The pointer B, being free to turn independent of the pointer A, is similarly placed upon the graduation "1" of the same scale $a$. The two pointers are now locked together by the eccentric. The two pointers, now in fixed relation to each other, are rotated about their axis, and the distance between their two ends will continually represent the ratio one to four. When the ends of both pointers simultaneously aline with graduations on the scale $b$, the numbers corresponding to said graduations will indicate the gear-wheels to be used. For example, when the pointer B is indicating the graduation which corresponds to the numbers "15 × 16," the pointer A will indicate the numbers "15 × 64," the product of the first pair of numbers being one-fourth the product of the last pair of numbers. If, now, gear-wheels of fifteen teeth and sixteen teeth, respectively, be used as the driving-gears and wheels of fifteen and sixty-four teeth, respectively, be used as the driven gears, the desired thread will be cut. If, however, one does not possess two gear-wheels of fifteen teeth, as necessitated by the above combinations, there are on the scale a large number of other combinations which can be used and which will be indicated by the two pointers by moving them to different positions in the apparatus while still locked together to indicate the ratio one to four. For example, when the pointer B indicates the pair of numbers "20 × 25" ( = 500) on the scale $b$ the pointer A will indicate the numbers "40 × 50" ( = 2,000.)

As above stated, the use of the pair of pointers is not essential. The two circular concentric scales $a$ and $b$ may also be movable with respect to each other around their common center, as shown in Fig. 1.

In order to find the numbers of teeth of the gearing to interpolate between the puppet of the lathe and the leading-screw, it will only be necessary to rotate the central scale $a$, which bears the pitch indications, until the two lines indicating the pitch of the leading-screw to be cut simultaneously coincide with two lines on the scale $b$, opposite which are indicated two pairs of factors, the respective products of which will be in the same ratio as the lengths of the pitches of the leading-screw and of the screw to be cut.

The two logarithmic scales may also be rectilinear and movable with respect to each other, as in ordinary calculating slide-rules.

I claim—

1. A universal table of gearings for screw-cutting lathes, having a scale for indicating the ratio of the desired screw pitch to the lead-screw pitch and a scale of pairs of numbers of gear-wheels, the graduations of the latter scale being such that the distance apart of the two graduations corresponding to the required combinations of numbers will be equal to the distance apart of the graduations on the former scale indicating the ratio of the products of such pairs of numbers.

2. A universal table of gearings for screw-cutting lathes, having two concentric logarithmic scales, one scale having graduations accompanied by numbers and also having a series of tables of pairs of numbers provided with reference-numbers, the other scale having graduations some of which are accompanied by pairs of numbers and others of which are accompanied by reference-numbers corresponding to the reference-numbers of the tables on the first-mentioned scale, and means for simultaneously indicating two required graduations on the latter scale having the same distance apart as two given graduations on the first scale.

In testimony whereof I have signed this specification in the presence of two subscribing witnesses.

HENRI MÖHLENBRUCK.

Witnesses:
JEAN VAUCHER,
HANSON C. COXE.